No. 615,466. Patented Dec. 6, 1898.
J. J. WADE.
HAND BASIN OR SINK.
(Application filed Dec. 11, 1897.)
(No Model.) 3 Sheets—Sheet 1.
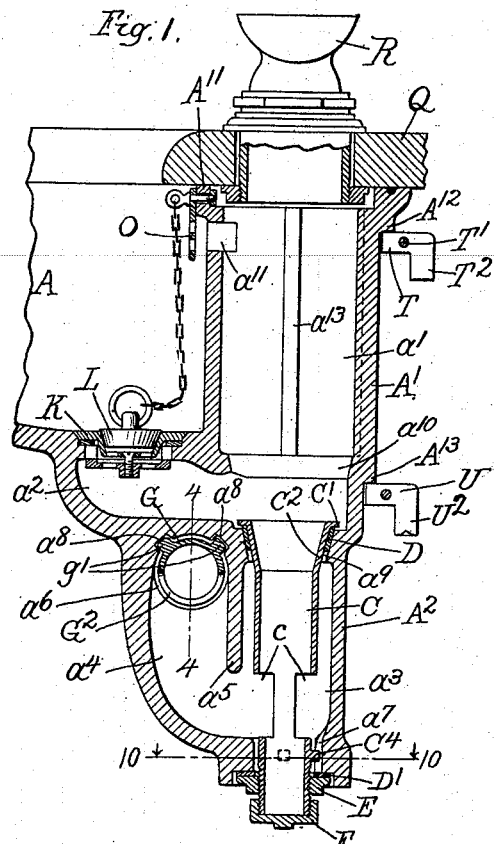
Fig. 1.
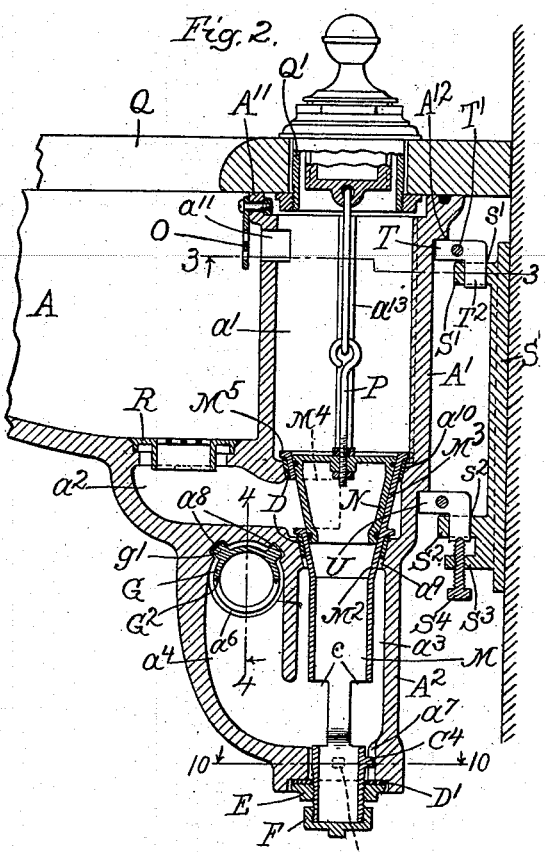
Fig. 2.
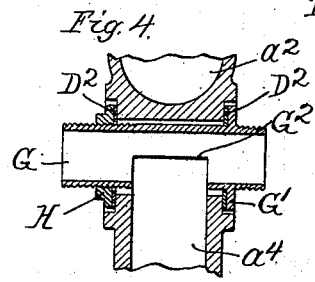
Fig. 4.
Fig. 5.
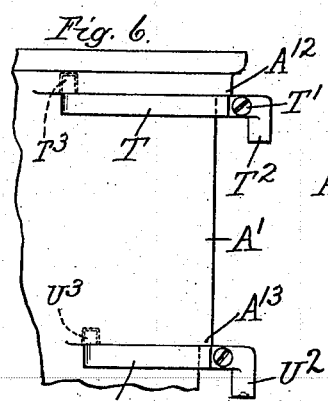
Fig. 6.
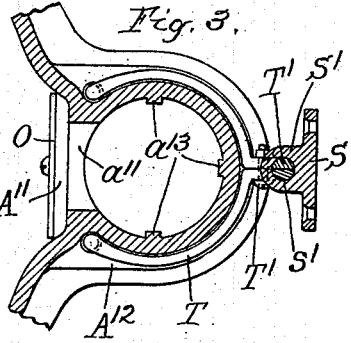
Fig. 3.
Witnesses.
E. T. Wray.
Jean Elliott
Inventor.
James J. Wade
by Burton and Burton
his attys
THE NORRIS PETERS CO., PHOTO-LITHO., WASHINGTON, D.C.

No. 615,466. Patented Dec. 6, 1898.
J. J. WADE.
HAND BASIN OR SINK.
(Application filed Dec. 11, 1897.)
(No Model.) 3 Sheets—Sheet 2.
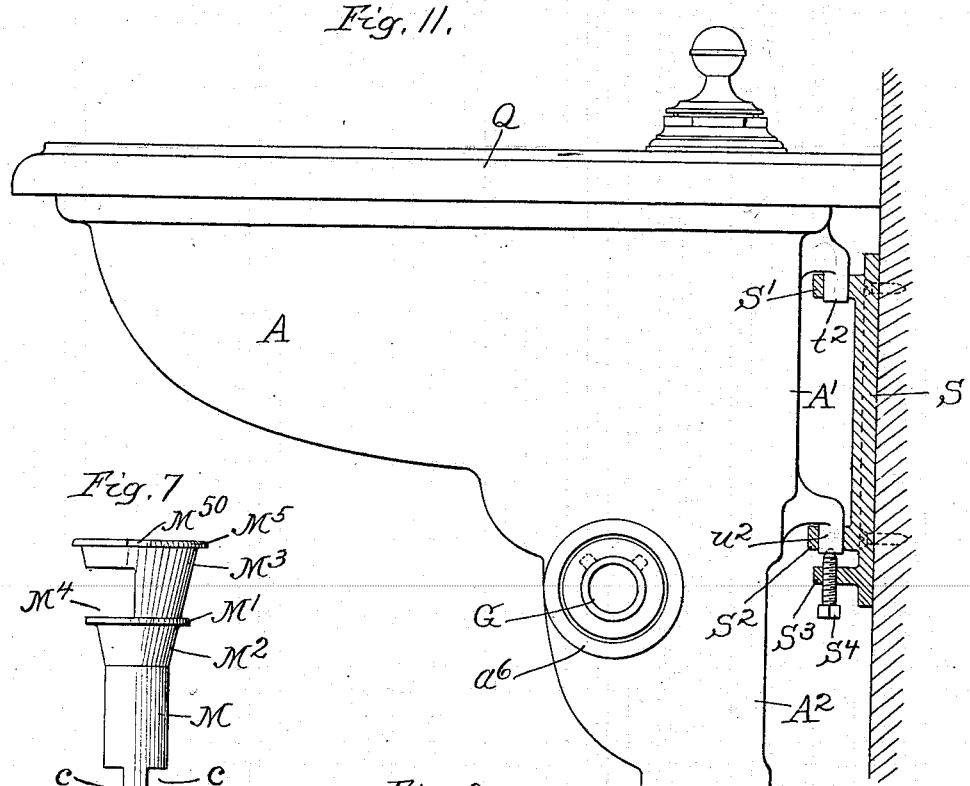
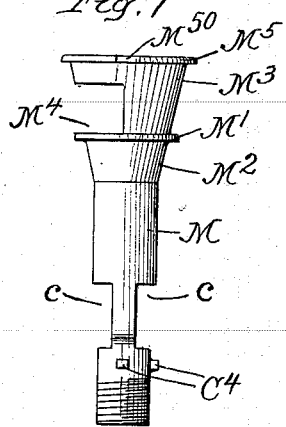
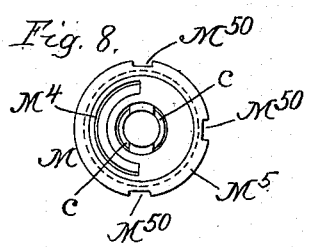
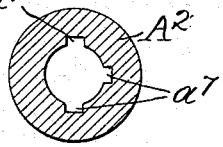
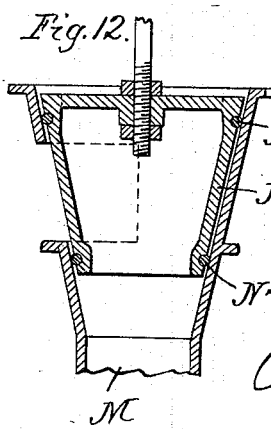
Witnesses
E. T. Wray
Jean Elliott
Inventor
James J. Wade
by Burton & Burton
his attys.

No. 615,466. Patented Dec. 6, 1898.
J. J. WADE.
HAND BASIN OR SINK.
(Application filed Dec. 11, 1897.)
(No Model.) 3 Sheets—Sheet 3.

Witnesses.
E. T. Wray.
Jean Elliott.

Inventor.
James J. Wade
by Burton and Burton
his attys.

UNITED STATES PATENT OFFICE.

JAMES J. WADE, OF CHICAGO, ILLINOIS.

HAND-BASIN OR SINK.

SPECIFICATION forming part of Letters Patent No. 615,466, dated December 6, 1898.

Application filed December 11, 1897. Serial No. 661,585. (No model.)

*To all whom it may concern:*

Be it known that I, JAMES J. WADE, a citizen of the United States, residing at Chicago, county of Cook, and State of Illinois, have invented certain new and useful Improvements in Hand-Basins or Sinks, which are fully set forth in the following specification, reference being had to the accompanying drawings, forming a part thereof.

This invention relates to the waste, overflow, and trap devices of a basin or sink and comprises also improved devices for mounting or securing such basin in position.

Figure 13:
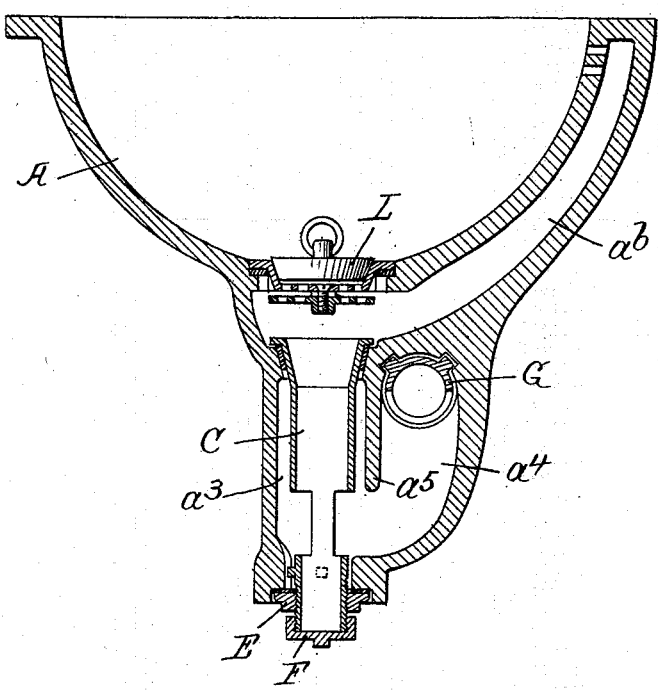
Figure 14:
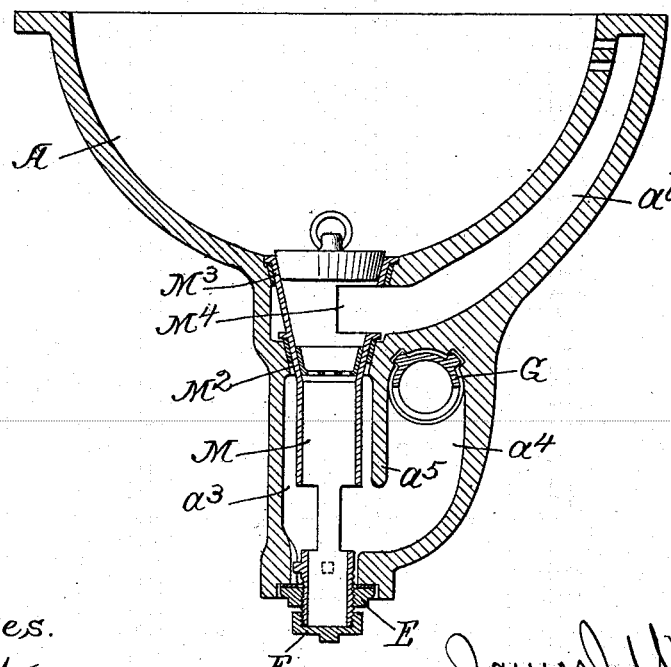

In the drawings, Figure 1 is a vertical section through the waste, overflow, and trap passages of a hand-basin having my improvements, the forward portion of the basin being broken away to reduce the compass of the view. Fig. 2 is a similar view showing a like construction fitted up with additional devices, making a secret waste, and showing also the means of attaching the basin bracketwise to the wall. Fig. 3 is a section at the line 3 3 on Fig. 2. Fig. 4 is a section at the line 4 4 on either Fig. 1 or Fig. 2. Fig. 5 is the same as Fig. 4, omitting the outlet-thimble. Fig. 6 is a detail side elevation showing the bracket-clamps for hanging the fixture. Fig. 7 is a detail elevation of the overflow and trap thimble shown in Fig. 2. Fig. 8 is a top plan of the same. Fig. 9 is a top plan of the hollow plug for said thimble. Fig. 10 is a section of the fixture at 10 10 on Figs. 1 and 2. Fig. 11 is a side elevation representing a basin of the same general form shown in the other figures, but made of metal and having integrally-formed means for mounting it bracketwise, the same being shown thus mounted. Fig. 12 is a full-sized sectional detail showing the tubular plug for the secret overflow in the seat. Figs. 13 and 14 are detail sections, respectively, of integral fixtures having an ordinary form of overflow-passage and a trap provided with a thimble, which in Fig. 13 is like that shown in Fig. 1 and in Fig. 14 is like that shown in Fig. 2.

My improved basin, of which the bowl is represented at A, is formed with a vertical pillar $A'$ at the side or rear, which extends from top to bottom of the bowl and is then produced below the bottom of the bowl and partly extended under it to form the outlet and trap passages. This lower portion is distinguished by the letter $A^2$, which indicates it as a whole, its central passages being indicated by special letters. The pillar $A'$ is tubular from top to bottom past the entire vertical extent of the bowl, its tubular cavity $a'$ being the overflow-passage. From the bowl at the side adjacent to the pillar the outlet-passage leads into the lower end of the tubular passage $a'$, and from the lower end of said tubular passage, coaxial therewith, the outlet-passage $a^3$ is formed in the trap extension $A^2$ of the pillar, and from the lower part of this outlet-passage, which is the down-limb of the trap, the up-limb $a^4$ extends up alongside said down-limb, separated therefrom by the diaphragm $a^5$ and terminating as to its upward extent below the horizontal outlet-passage $a^2$. At this point—that is to say, at the upper end of the up-limb $a^4$—a horizontal outlet is formed, opening through the slight boss or cross-head $a^6$, in the iron or earthenware of which the fixture is made. The tubular cavity which forms the down-limb $a^3$ extends through to the bottom of the trap extension $A^2$ of the pillar and is open at the lower end. Similarly the cross-passage $a^6$, which forms the outlet-port, extends entirely through the substance of the fixture, being open at both sides.

C is a thimble, preferably made of brass or other suitable metal, adapted to be inserted down through the pillar and into the down-limb $a^3$, where it is permanently lodged, having for that purpose a flange $C'$ at the upper end and below said flange a tapering shoulder $C^2$, to which the upper end of the passage in the fixture which forms said down-limb is conformed in a shoulder $a^9$, a suitable rubber gasket D being interposed between said tapering shoulders. At a point corresponding to the opening from the down-limb of the trap into the up-limb thereof the thimble B is provided with a sufficient number of apertures $c\ c$ to constitute a practically free passage for the outflow from the basin into the up-limb of the trap, and below said apertured portion the thimble C is slightly contracted and provided with radially-projecting lugs $C^4\ C^4\ C^4$, for which the longitudinal grooves $a^7\ a^7\ a^7$ are formed in the inner surface of the lower mouth or hub of the tubular cavity $a^3$ of the fixture, and as the thimble is inserted in the fixture the lugs $B^4$ take into the grooves $a^7$ and render the thimble non-rotatable after it is in position. The lower end of the thimble is exteriorly threaded, and a nut E thereon is adapted to bind against the lower end of the pillar extension $A^2$, suitable packing $D'$ to make a water-tight joint being provided. The lower end of the thimble may be closed by a cap F, or, if desired for any purpose to connect the final-outflow pipe at that point, it may be done. Through the cross-port $a^6$ at the upper end of the up-limb of the trap a thimble G is introduced, said thimble having one end provided with a flange $G'$ and exteriorly threaded beyond the flange, the other end being threaded and adapted to receive a jam-nut H, and intermediate the ends, at a point which when the thimble is in place corresponds to the upper mouth of the up-limb of the trap at its opening into the cross-port, the thimble is cut away through half its circumferential extent, as seen at $G^2$. Upon the other half of the thimble there are formed two exterior radially-projecting lugs $g'$ $g'$, which take into corresponding grooves $a^8$ $a^8$, formed in the inner wall of the cross-port, so that when the thimble is inserted through the fixture the lugs taking into the grooves render it non-rotatable, and the jam-nut H affords means for binding it permanently in place, suitable packing-gaskets $D^2$ $D^2$ being interposed between the flange and nut, respectively, and the earthenware or metal of the fixture. The final-outflow pipe may be connected to one threaded terminal of the thimble G and the vent-pipe to the other, or one may be capped, or if the final outflow is taken from the lower end, the trap being disused, both threaded ends of the thimble G may be capped. It will be understood that such mode of use of the device is not advised, but that the cap F at the lower end of the thimble C is in any event desirable in order to give access to the trap for cleaning.

When this fixture is to be used with an ordinary waste—that is, a non-secret waste—the opening from the bowl into the passage $a^2$ will be provided with a suitable plug-seat K, (shown in Fig. 1,) adapted to receive an ordinary plug L. The fixture, however, is adapted to be converted into a secret waste by the substitution of a slightly-modified form of a thimble for the thimble C. Such modified form of thimble M is shown in Fig. 2, and the same may be used in all cases even when a secret waste is not desired. This thimble M seats not only at the top of the passage $a^3$—that is, at the mouth thereof in the passage $a^2$, where it has the flange $M'$, corresponding to the flange $C'$, and the tapering shoulder $M^2$, corresponding to the shoulder $C^2$—but also upon a tapering shoulder $a^{10}$, which is formed at the lower end of the vertical passage $a'$ and above the passage $a^2$—that is, at the mouth or opening of the passage $a'$ into the passage $a^2$ from above—the sleeve having a tapering shoulder $M^3$ fitting the shoulder $a^{10}$ of the fixture and having also a flange $M^5$ above said shoulder. The seat is formed at this point in the same manner as at the shoulder $a^9$ and packed with a rubber gasket D in the same manner as described in respect to said shoulder $a^9$. When this longer thimble M is employed, it is apertured at $M^4$ between the points of its lodgment on the shoulders $a^9$ and $a^{10}$ at a point corresponding to the mouth or opening of the passage $a^2$ laterally into the vertical tubular passage comprising $a'$ and $a^3$, so that the direct outflow from the bowl enters the thimble at this point. In order to employ the secret waste in the fixture thus constructed, I use a tubular plug N, adapted to seat in the upper flaring end of the thimble M and close the mouth $M^4$, while leaving open a free passage through such tubular plug for the overflow to pass from the tubular cavity $a'$ into the trap. In order to direct the sleeve to the proper position and also to assist in retaining it against rotation while the jam-nut is being screwed up, the flange $M^5$ has the notches $M^{50}$ $M^{50}$ $M^{50}$, which engage the ribs $a^{13}$ $a^{13}$ $a^{13}$ in the wall of the tubular cavity $a'$.

It will be understood that the overflow enters the tubular cavity through an aperture $a^{11}$ at the upper end of said tubular cavity and near the upper margin of the bowl. Instead of making this entrance from the bowl into the overflow in the form of a sieve—that is, by means of a plurality of small apertures through the substance of the bowl—I prefer to make it of one large aperture, as illustrated, and in front of this aperture I suspend a vertical strainer O, which is suitably secured by a bolt to the boss $A^{11}$ above the aperture $a^{11}$. This strainer can thus be readily removed at any time and cleaned if it becomes obstructed, and a very free access is obtained through the aperture $a^{11}$ into the overflow-passage. The tubular valve N is operated by a linked pull-rod P extending up through the pillar and attached to a suitable handle at the upper end, the slab Q being apertured for the purpose of admitting the plug and provided with a suitable sleeve $Q'$, which is secured in the slab and provided with a familiar device for holding the plug up or allowing it to drop to its seat. When the secret waste is not employed, the aperture in the slab may be covered with a suitable cup R, as in Fig. 1. For the purpose of mounting this bowl bracketwise against the wall and binding it tightly up against the slab, which it is preferable to mount independently and fixedly with respect to the wall in order that the bowl may be removed whenever necessary without detaching the slab, I employ a bracket device, which will now be described. It comprises a wall-piece S, adapted to be made permanently secure in position on the wall. Projecting horizontally from this wall-piece are two lugs $S'$ and $S^2$, vertically apertured at $s'$ and $s^2$.

T is a yoke formed of two parts and adapted to be bound together by the bolt T', clasping the upper part of the pillar A' just below an exterior boss or shoulder A$^{12}$, formed thereon a little below the upper end or margin and apertured to receive the finger T$^3$ of the yoke. The yoke, when its two parts are bound together by the bolt, terminates in a short downwardly-projecting pintle T$^2$, adapted to enter the aperture or eye $s'$ in the upper lug S' of the wall-plate S. A somewhat similar yoke U, shaped to conform to the fixture at the position at which it clasps the latter below the bowl, is provided with a similar pintle U$^2$, which enters the eye in the lower lug S$^2$ of the wall-plate. The earthenware or metal of the fixture is formed by an exterior downwardly-facing shoulder A$^{13}$ to adapt it to seat upon this lower yoke and having sockets for the fingers U$^3$ at the extremities. Below the lower lug S' the wall-plate has a third lug S$^3$, which projects past and underneath the eye of the lower lug S$^2$ and is provided with an adjusting-bolt S$^4$, which is screwed through said lug S$^3$ axially in line with the apertures $s'$ $s^2$ of the other lugs. The lower end of the downwardly-pointed stem U$^2$ of the lower bracket is countersunk to center the point of the adjusting-bolt S$^4$, and when the yokes, suitably clamped onto the fixture, have their stems lodged in the eyes of the lugs S' S$^2$, respectively, the adjusting-bolt being screwed up will force the fixture up tight against the slab, which is independently supported on the wall. When the fixture is of metal, the pintles may be made integral therewith, as in Fig. 11, wherein these pintles are indicated by the letters $t^2$ and $u^2$.

It will be observed that the mode of securing the metal fittings to the earthenware is such as to avoid to a large extent and usually to prevent entirely the danger of the earthenware being broken at the attachment of the fittings and pipes thereto by contraction of the metal, as frequently happens in the case of earthenware basins provided with the customary means of attaching the pipe-fittings. In my improved construction whether the outlet-pipe is attached at the end of the vertical sleeve, which extends through the down-limb of the trap, or at the end of the horizontal sleeve, which extends across the upper end of the up-limb, the strain upon the earthenware due to contraction of the pipe or of the thimbles is exerted merely as a compressing strain between the two shoulders of the fitting, which bear upon the earthenware at such long distance apart and with such a heavy portion of the fixture between the two opposite bearings that there is no danger of any portion of the earthenware being broken off by any contraction which can occur.

A serious objection hitherto recognized against the manufacture of fixtures of this class with the trap integral with the basin or remainder of the fixture is that the diaphragm between the two limbs of the trap is liable to be imperfect—that is, if it is of iron it is liable to contain blow-holes and if it is of earthenware it is liable to be crazed in the baking or glazing—and such defects are not discoverable by any ordinary mode of inspection, because the diaphragm is inaccessible to such critical inspection as will be necessary to detect these defects. The result is that very frequently, notwithstanding the trap is filled with water, sewer-gas passes above the water through the blow-holes or craze-apertures of the diaphragm, so that the protection intended to be afforded by the trap is lost. This objection and defect are overcome by the use of the metal sleeve C or M, which I employ to line the down-limb of the trap, such sleeve being continuous and without lateral aperture down to the level of the lower lip of the diaphragm, so that even if the diaphragm were omitted the trap would be complete.

These fittings are all adapted to be used in the rough—that is, without exterior finishing by machine—the rubber gaskets which form their seats dispensing with the need of machinery to make them water-tight and in addition affording the necessary accommodation for the expansion and contraction to which the fittings are liable when hot and cold water are passed through them in succession. The plug N is also adapted to be used without exterior machinery by means of exterior grooves, which receive two rubber rings N' N$^2$ in positions to seat, respectively, above and below the level of the bottom outlet-passage, as seen in full-size view, Fig. 12.

The thimble which lines the down-limb of the trap may be employed in either form C or M, in connection with an integral fixture in which said thimble is inserted through the bottom outlet-passage instead of through the overflow-passage. Such a structure is shown in Figs. 13 and 14. In Fig. 13 the form of the thimble is that of Fig. 1, (denoted by the letter C,) and it seats at the upper end only below the bottom outlet. In Fig. 14 the form of the thimble is that shown in Fig. 2, (denoted by the letter M,) and it seats both above and below the bottom outlet-passage, and the aperture M$^4$ between the seats M$^2$ and M$^3$ admits the overflow from the overflow-passage $a^b$, which is the more familiar form, following the contour of the bowl instead of the form shown in Figs. 1 and 2.

I claim—

1. An integral water-fixture comprising the basin having a bottom outlet-passage and an overflow-passage and a trap whose down-limb is in line with one of said passages and together therewith constitute an aperture extending through the fixture to the bottom, in combination with a thimble adapted to be inserted down into such down-limb from the upper end and stopped at the upper end thereof and protruding from the bottom end and exteriorly threaded and provided with a nut, and closed at the end; such thimble being laterally apertured at the level of the lower end of the up-limb of the trap.

2. An integral water-fixture comprising the basin having a bottom outlet-passage and an overflow-passage and a trap whose down-limb is in line with one of said passages and together therewith constitutes an aperture extending through the fixture to the bottom, in combination with a thimble adapted to be inserted down through such passage, into and through the down-limb and protruding therefrom and exteriorly threaded and provided with a nut and closed at the end, such thimble having shoulders seated water-tight above and below the level of the bottom outlet-passage, and apertures between such shoulders and also at the level of the lower end of the up-limb of the trap.

3. An integral fixture comprising the basin having a bottom outlet-passage, an overflow-passage, and a trap whose down-limb is in line with one of said passages and together therewith constitutes an aperture extending through the fixture to the bottom, in combination with a thimble adapted to be inserted down into such down-limb and stopped at the upper end thereof and protruding from the bottom end, and closed at such protruding end, and at the protruding portion provided with an exterior device reacting against the outer side of the fixture to strain the thimble longitudinally; and a suitable packing interposed between the fixture and such exterior device around said protruding thimble to close the aperture through which the thimble protrudes, such thimble being laterally apertured at the level of the lower end of the up-limb of the trap.

4. In combination with an integral fixture comprising a basin and a vertically-apertured pillar adjacent thereto, and having a bottom outlet and overflow leading into the vertical passage through said pillar, said passage being reduced in diameter below the discharge thereinto of the bottom outlet, a thimble or sleeve adapted to be inserted through the upper larger portion of said vertical passage down into the lower reduced portion, and provided with a shoulder adapted to seat at the upper end of said reduced portion below the end of the bottom outlet, and having its lower end protruding from the lower end of the pillar and exteriorly threaded and provided with a nut.

5. An integral fixture comprising a basin and the vertically-apertured pillar adjacent thereto and extending below the bottom thereof, said pillar having a vertical passage formed within it extending from end to end, larger at the upper part, the overflow and bottom outlet of the basin leading into said larger part, the lower part constituting the down-limb of a trap, and the extension of the pillar below the bottom of the basin having a passage leading into said vertical passage and constituting the up-limb of the trap, and provided with an outlet at the upper end, in combination with a sleeve adapted to be inserted down through the upper larger portion of the vertical passage in the pillar and into the lower reduced portion thereof, and adapted to lodge and be stopped at the upper end of said reduced portion below the entrance of the bottom outlet, said sleeve protruding from the bottom of the pillar and exteriorly threaded, and provided with a nut and adapted to be capped, and having lateral apertures at the level of the lower mouth of the up-limb of the trap.

6. An integral fixture comprising a basin and trap and overflow and outlet passages leading into the trap from the basin and having a final-outlet passage from the upper end of the trap, said outlet-passage being formed by a horizontal aperture extending entirely through the integral substance of the fixture and open at both sides thereof, in combination with a sleeve exteriorly flanged at one end, and adapted to be inserted through said horizontal aperture and be stopped by its flange, and exteriorly threaded at the other end and provided with a nut, and having a lateral aperture adapted to be registered with the upwardly-open end of the up-limb of the trap.

7. In combination with an integral fixture comprising a basin and a vertically-apertured pillar adjacent thereto and having a bottom outlet; an overflow leading into the vertical passage through said pillar, said passage being reduced in diameter below the discharge thereinto of the bottom outlet, and a thimble or sleeve adapted to be inserted through the upper larger portion of said vertical passage down into the lower reduced portion, and provided with a shoulder adapted to seat at the upper end of said reduced portion below the end of the bottom outlet, and having its lower end protruding from the lower end of the pillar and exteriorly threaded and provided with a nut; the lower mouth of the vertical passage being provided with longitudinal grooves $a^7$, and the lower end of the thimble having radial lugs adapted to take into said grooves to render the thimble non-rotatable by the nut.

8. An integral fixture comprising a basin; a pillar adjacent thereto vertically apertured from top to bottom, such aperture constituting an overflow-passage at the upper part, and at the lower part the down-limb of a trap, the overflow-outlet and the bottom outlet of the basin leading into said vertical passage, and the up-limb of the trap leading from the lower end thereof, said vertical passage being reduced in diameter below the entrance thereinto of the bottom outlet-passage, and provided with seats or shoulders in parallel planes respectively above and below such entrance; a thimble adapted to be inserted down through the upper larger portion of said vertical passage and extending into and through the lower reduced portion, and protruding therefrom at the lower part and provided with a nut and suitably closed at the end and laterally apertured at the level of the lower mouth of the up-limb of the trap; said thimble being provided with shoulders adapted to seat at the seats or shoulders respectively of the fixture above and below the entrance to the bottom outlet, and suitable means for making water-tight connection between the sleeve and the shoulders of the fitting, said sleeve having a lateral aperture between said shoulders adapted to register with the bottom outlet-passage, and a hollow plug adapted to seat within the upper end of said sleeve closing said lateral aperture.

9. In combination with a basin-fixture and the slab independently secured above the same; a wall-plate having apertured lugs $S'$ and $S^2$, and the lug $S^3$ projecting below the aperture of one of them, the basin-fixture being provided with pintles adapted to enter apertures of said lugs $S'$ and $S^2$, and the bolt $S^4$ set through the lug $S^3$, and adapted to be screwed up against the overhanging pintle to set the basin tight against the slab.

10. In combination with the basin-fixture and the slab independently supported above the same; the wall-plate having apertured lugs $S'$ $S^2$ and the lug $S^3$ projecting below the aperture of one of them; brackets adapted to be clamped to the basin having respectively pintles to enter the apertures of the lugs, and the bolt $S^4$ adapted to be screwed through the lug $S^3$ against the overhanging pintle to force the basin tightly against the under side of the slab.

In testimony whereof I have hereunto set my hand, in the presence of two witnesses, at Chicago, Illinois, this 4th day of December, 1897.

JAMES J. WADE.

Witnesses:
 CHAS. S. BURTON,
 JEAN ELLIOTT.